United States Patent
Kent et al.

(10) Patent No.: US 8,102,900 B2
(45) Date of Patent: Jan. 24, 2012

(54) METHOD AND APPARATUS FOR EFFICIENT GOLD CODE GENERATION AND MANAGEMENT IN WCDMA SYSTEMS

(75) Inventors: Mark Kent, Vista, CA (US); Francis Swarts, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 1366 days.

(21) Appl. No.: 11/399,953

(22) Filed: Apr. 7, 2006

(65) Prior Publication Data
US 2007/0237116 A1   Oct. 11, 2007

(51) Int. Cl.
*H04B 1/707* (2006.01)
(52) U.S. Cl. ........................................ 375/150
(58) Field of Classification Search .............. 375/130, 375/134, 137, 142–145, 148–150, 152, 260; 370/208, 209, 320, 335, 342
See application file for complete search history.

(56) References Cited

U.S. PATENT DOCUMENTS

| | | | |
|---|---|---|---|
| 6,038,250 A | 3/2000 | Shou et al. | |
| 6,526,091 B1 * | 2/2003 | Nystrom et al. | 375/142 |
| 7,076,007 B1 * | 7/2006 | Daniele et al. | 375/341 |
| 2003/0108203 A1 | 6/2003 | Sambhwani | |
| 2004/0161020 A1 * | 8/2004 | Mathew et al. | 375/149 |
| 2005/0084112 A1 * | 4/2005 | Kim et al. | 380/268 |
| 2005/0152265 A1 * | 7/2005 | Denk | 370/209 |
| 2007/0237212 A1 * | 10/2007 | Kent et al. | 375/149 |

FOREIGN PATENT DOCUMENTS
EP   1517454 A2   3/2005
* cited by examiner

*Primary Examiner* — Young T. Tse
(74) *Attorney, Agent, or Firm* — McAndrews, Held & Malloy, Ltd.

(57) ABSTRACT

A method and an apparatus for efficient Gold code generation and management in WCDMA systems are presented. Aspects of the method may include simultaneously generating, based on the codeword sequence, a plurality of scrambling code segments associated with a scrambling code. A plurality of scrambling code segments, where each is associated with a corresponding one of a plurality of scrambling codes, may also be simultaneously generated. The plurality of scrambling codes may form a scrambling code group. Based on the codeword sequence, a plurality of time shifted versions of at least one scrambling code segment associated with a scrambling code may also be simultaneously generated.

27 Claims, 6 Drawing Sheets

METHOD AND APPARATUS FOR EFFICIENT GOLD CODE GENERATION AND MANAGEMENT IN WCDMA SYSTEMS

CROSS-REFERENCE TO RELATED APPLICATIONS/INCORPORATION BY REFERENCE

U.S. patent application Ser. No. 11/173,854 filed on Jun. 30, 2005; and

U.S. patent application Ser. No. 11/399,908 filed on even date herewith.

Each of the above applications is hereby incorporated herein by reference in its entirety.

FIELD OF THE INVENTION

Certain embodiments of the invention relate to wireless communication. More specifically, certain embodiments of the invention relate to a method and system for efficient Gold code generation and management in WCDMA systems.

BACKGROUND OF THE INVENTION

Mobile communication has changed the way people communicate and mobile phones have been transformed from a luxury item to an essential part of every day life. The use of mobile phones today is dictated by social situations, rather than hampered by location or technology. While voice connections fulfill the basic need to communicate, and mobile voice connections continue to filter even further into the fabric of every day life, the mobile Internet is the next step in the mobile communication revolution. The mobile Internet is poised to become a common source of everyday information, and easy, versatile mobile access to this data will be taken for granted.

Third generation (3G) cellular networks have been specifically designed to fulfill these future demands of the mobile Internet. As these services grow in popularity and usage, factors such as cost efficient optimization of network capacity and quality of service (QoS) will become even more essential to cellular operators than it is today. These factors may be achieved with careful network planning and operation, improvements in transmission methods, and advances in receiver techniques. To this end, carriers need technologies that will allow them to increase downlink throughput and, in turn, offer advanced QoS capabilities and speeds that rival those delivered by cable modem and/or DSL service providers. In this regard, networks based on wideband CDMA (WCDMA) technology may make the delivery of data to end users a more feasible option for today's wireless carriers.

WCDMA networks may allow a mobile handset to communicate with a multiple number of base stations. This may take place, for example, during a soft-handoff from one base station to another base station that utilizes the same frequency band. On occasions, there may be handoffs from one base station to another where the two base stations use different frequencies. This may occur, for example, when a mobile station interfaces with a different wireless service provider, or for hotspots where one service provider may need to use more than one frequency. In these cases, the mobile handset may need to tune in to the frequency of the new base station. This may require additional circuitry to be able to synchronize to a second frequency of the second base station while still using the first frequency for communicating with the first base station. The additional synchronization circuitry may be an undesirable extra cost for the mobile handset.

WCDMA utilizes spread spectrum techniques that are based on scrambling a transmitted signal at a transmitter. The scrambled signal may be descrambled when it is received for processing at a receiver. The transmitter may utilize a scrambling code to scramble the signal and the receiver may utilize a corresponding descrambling code to descramble the received scrambled signal.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for efficient Gold code generation and management in WCDMA systems, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for efficient Gold code generation and management in WCDMA systems. Aspects of the method may comprise generating at least one codeword sequence. Based on the codeword sequence, a plurality of scrambling code segments associated with a scrambling code may be simultaneously generated. A plurality of scrambling code segments, each associated with a corresponding one of a plurality of scrambling codes may also be simultaneously generated. The plurality of scrambling codes may form a scrambling code group. Based on the codeword sequence, a plurality of time shifted versions of at least one scrambling code segment associated with a scrambling code may be simultaneously generated.

Figure 1:
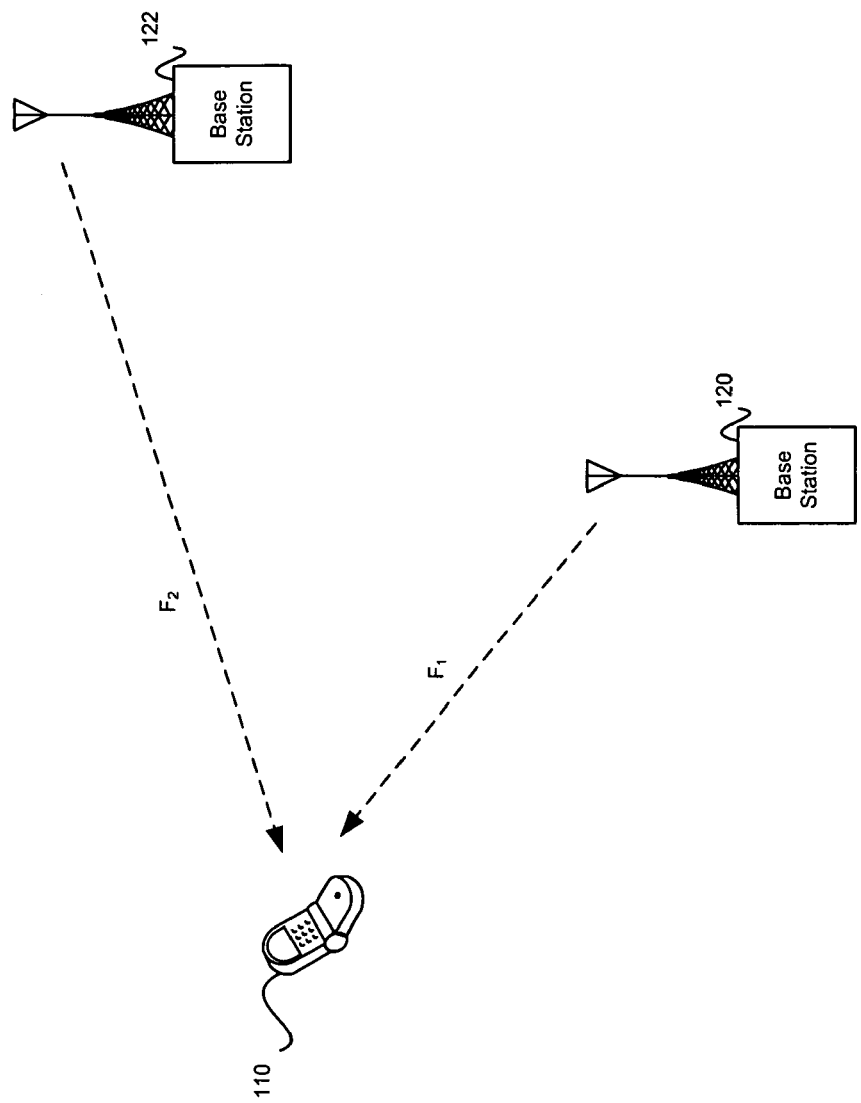
FIG. 1 is an exemplary diagram illustrating a WCDMA handset communicating with two WCDMA base stations, which may be utilized in connection with an embodiment of the invention.

FIG. 1 is an exemplary diagram illustrating a WCDMA handset communicating with two WCDMA base stations, which may be utilized in connection with an embodiment of the invention. Referring to FIG. 1, there is shown a mobile terminal 110 and base stations 120 and 122. The base stations 120 and 122 may be located within different cells within a WCDMA network. The mobile terminal 110 may receive communications from the base station 120 using frequency $F_1$. From the perspective of the mobile terminal 110, the cell associated with base station 120 may be referred to as an active cell. The cell associated with the base station 122 may be referred to as a neighboring cell.

The base station 120 may generate spread spectrum signals utilizing one or more scrambling codes selected from a scrambling code group. A spread spectrum signal may be generated by utilizing a Gold code, for example. The scrambling code group may comprise 8 scrambling codes, for example. The base station 122 may generate spread spectrum signals utilizing one or more scrambling codes that may be different from the corresponding scrambling codes utilized at the base station 120. The base station 122 may utilize a scrambling code selected from a scrambling code group that may be different from the scrambling code group associated with the base station 120. The mobile terminal 110 may descramble a received scrambled signal transmitted by the base station 120 by utilizing a descrambling code based on a corresponding scrambling code associated with the base station 120. The mobile terminal 110 may descramble a received scrambled signal transmitted by the base station 122 by utilizing a descrambling code based on a corresponding scrambling code associated with the base station 122.

Figure 2:
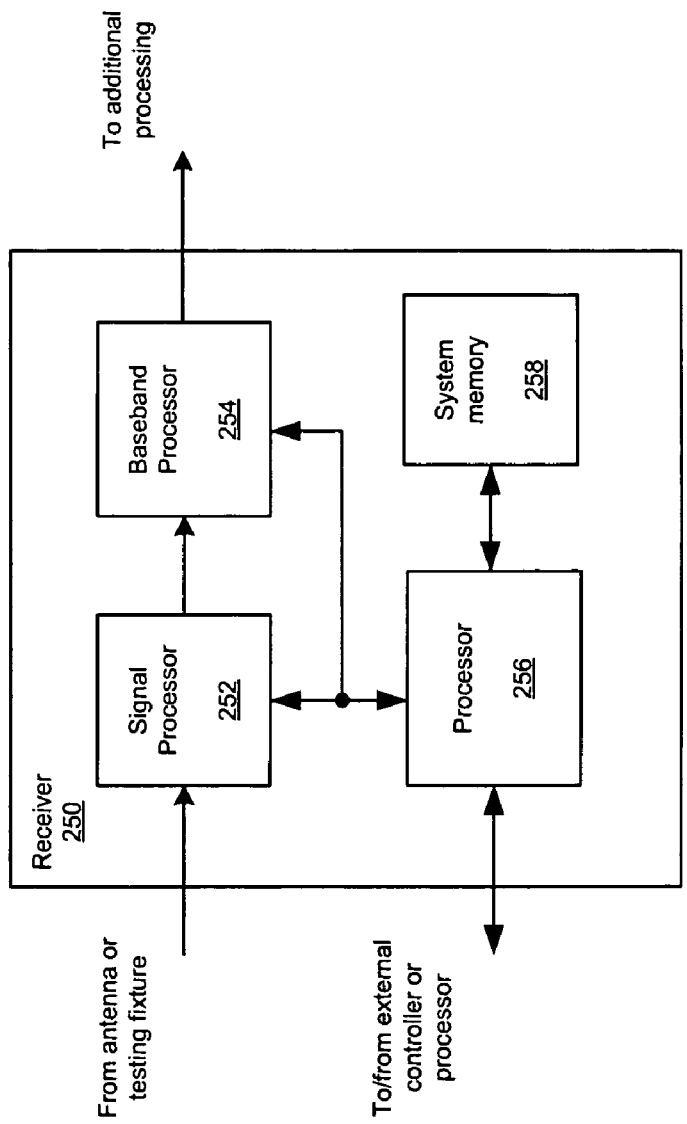
FIG. 2 is a block diagram of an exemplary RF receiver system, which may be utilized in connection with an embodiment of the invention.

FIG. 2 is a block diagram of an exemplary RF receiver system, which may be utilized in connection with an embodiment of the invention. Referring to FIG. 2, there is shown a RF receiver system 250 that may comprise a signal processor block 252, a baseband processor block 254, a processor 256, and a system memory 258. The signal processor block 252 may comprise suitable logic, circuitry, and/or code that may enable receiving of RF signals. The signal processor block 252 may be coupled to an antenna for signal reception. The signal processor block 252 may demodulate a received signal before further processing. Moreover, the signal processor block 252 may comprise other functions, for example, filtering the received signal, amplifying the received signal, and/or downconverting the received signal to an analog baseband signal. The signal processor block 252 may also digitize the analog baseband signal to a digital baseband signal, and digitally process the digital baseband signal, for example, to filter the digital baseband signal.

The baseband processor block 254 may comprise suitable logic, circuitry, and/or code that may enable processing of digital baseband signals communicated by the signal processor block 252. The processor 256 may comprise suitable logic, circuitry, and/or code that may enable controlling of operations of the signal processor block 252 and/or the baseband processor block 254. For example, the processor 256 may be utilized to update and/or modify programmable parameters and/or values in a plurality of components, devices, and/or processing elements that may be in the signal processor block 252 and/or the baseband processor block 254. For example, there may be programmable gain amplifiers in the signal processor block 252. Control and/or data information may be transferred from at least one processor external to the RF receiver system 250 to the processor 256. Similarly, the processor 256 may transfer control and/or data information to at least one processor external to the RF receiver system 250.

The processor 256 may utilize the received control and/or data information to determine a mode of operation of the signal processor block 252. For example, the processor 256 may select a specific frequency for a local oscillator, or a specific gain for a variable gain amplifier. Moreover, the specific frequency selected and/or parameters needed to calculate the specific frequency, and/or the specific gain value and/or the parameters needed to calculate the specific gain, may be stored in the system memory 258 via the processor 256. This information stored in system memory 258 may be transferred to the signal processor block 252 from the system memory 258 via the processor 256. The system memory 258 may comprise suitable logic, circuitry, and/or code that may enable storage of a plurality of control and/or data information, including parameters needed to calculate frequencies and/or gain, and/or the frequency value and/or gain value.

Figure 3:
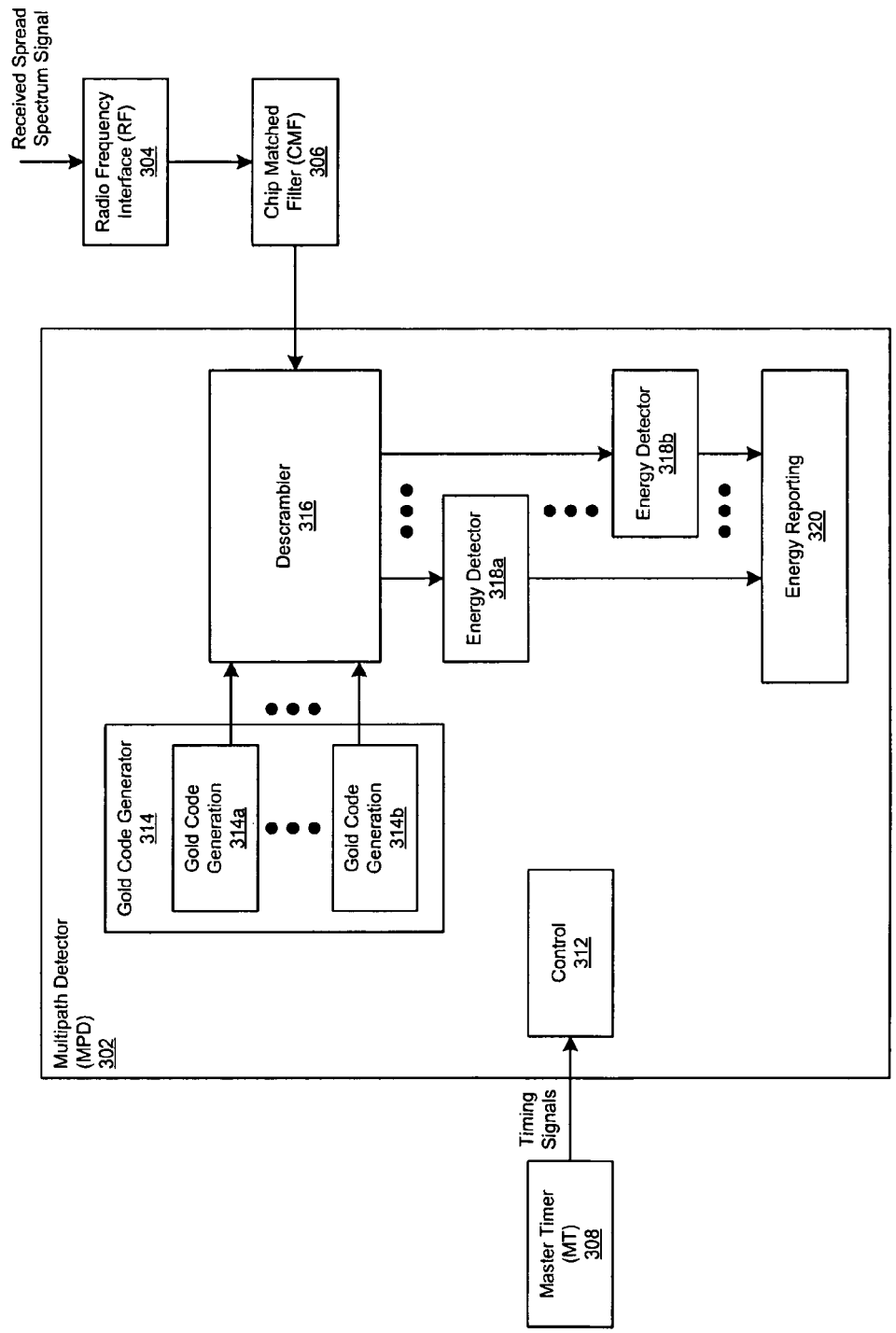
FIG. 3 is a block diagram of a system for efficient Gold code generation and management in WCDMA systems, in accordance with an embodiment of the invention.

FIG. 3 is a block diagram of a system for efficient Gold code generating and management in WCDMA systems, in accordance with an embodiment of the invention. Referring to FIG. 3, there is shown a multipath detector (MPD) 302, a radio frequency interface (RF) 304, a chip matched filter (CMF) 306, and a master timer (MT) 308. The MPD 302 may further comprise a control block 312, a plurality of Gold code generation blocks 314a . . . 314b, a descrambler block 316, a plurality of energy detector blocks 318a . . . 318b, and an energy reporting block 320. In various embodiments of the invention, the MPD 302, RF block 304, CMF block 306, and MT block 308 may be located within a mobile terminal 110.

The RF block 304 may comprise suitable logic, circuitry, and/or code that may enable amplification and conversion of an analog RF signal, received via a WCDMA channel for example, down to baseband frequency. The RF block 304 may comprise an analog-to-digital (A/D) converter that may be utilized to generate a digital equivalent of the received analog signal.

The CMF block 306 may comprise suitable logic, circuitry, and/or code that may enable filtering of the output from the RF block 304 and to produce complex in-phase and quadrature components (I, Q) of the filtered signal. In an embodiment of the invention, the CMF block 306 may comprise a pair of digital filters that are adapted to filter the I and Q components to within, for example, the 3.84 MHz bandwidth of WCDMA baseband signal.

The MT block 308 may comprise suitable logic and/or circuitry that may enable generation of clocking signals to the MPD 302. In an exemplary embodiment of the invention, the MT block 308 may generate a 15.36 MHz clock signal.

The MPD 302 may comprise suitable logic, circuitry, and/or code that may enable synchronization and timing acquisition utilizing the two step method. The MPD 302 may also enable multipath detection. Multipath detection may comprise detection of individual path signals within a multipath cluster.

The control block 312 may comprise suitable logic, circuitry, and/or code that may enable control of operations within the MPD 302. The control block may control the generation of Gold codes, the descrambling of received spread spectrum signals, the detection of energy levels associated with the descrambled signals, and the determination of a maximum energy level among a plurality of detected energy levels.

The Gold code generation block 314a may comprise suitable logic, circuitry, and/or code that may enable generation of one or more scrambling codes. Within a WCDMA frame, a scrambling code may be utilized to generate a spread spectrum signal. The scrambling code may comprise a plurality of scrambling code segments. Each of the plurality of scrambling code segments, for example, $SCR_0$, $SCR_1$, $SCR_2$, . . . , $SCR_{14}$, may correspond to a slot within a WCDMA frame.

In various embodiments of the invention, at least a portion of each of the plurality of scrambling code segments $SCR_0$, $SCR_1, SCR_2, \ldots, SCR_{14}$, associated with a scrambling code, may be generated simultaneously. A plurality of scrambling codes, $S[0], S[1], \ldots, S[7]$ may also be simultaneously generated, for example. A plurality of code segments $SCR[0]_0, SCR[0]_1, SCR[0]_2, \ldots, SCR[0]_{14}$ may be associated with the scrambling code $S[0]$. A corresponding plurality of code segments $SCR[1]_0, SCR[1]_1, SCR[1]_2, \ldots, SCR[1]_{14}$ may be associated with the scrambling code $S[1]$. A corresponding plurality of code segments $SCR[7]_0, SCR[7]_1, SCR[7]_2, \ldots, SCR[7]_{14}$ may be associated with the scrambling code $S[7]$. In various embodiments of the invention a plurality of scrambling code segments $SCR[0]_1, SCR[1]_1, \ldots, SCR[7]_1$ may be generated simultaneously, for example. The plurality of scrambling code segments may be associated with a corresponding one in the plurality of scrambling codes $S[0], S[1], \ldots, S[7]$. For example, the scrambling code segment $SCR[0]_1$ may be associated with the scrambling code $S[0]$, while the scrambling code segment $SCR[1]_1$ may be associated with the scrambling code $S[1]$.

A plurality of time shifted versions of at least one scrambling code segment may be generated simultaneously. A scrambling code segment, $SCR_0$, from among a plurality of scrambling code segments $SCR_0, SCR_1, SCR_2, \ldots, SCR_{14}$, may be generated at a plurality of time instants $t_0, t_1, t_2, \ldots, t_{14}$, for example. The scrambling code segment $SCR_0$, which is generated starting at a time instant $t_0$, may be referred to as $SCR_0(t_0)$, for example. The scrambling code segment $SCR_0$, which is generated starting at a time instant $t_1$, may be referred to as $SCR_0(t_1)$, for example. The scrambling code segment $SCR_0$, which is generated starting at a time instant $t_2$, may be referred to as $SCR_0(t_2)$, for example. The scrambling code segment $SCR_0$, which is generated starting at a time instant $t_{14}$, may be referred to as $SCR_0(t_{14})$, for example. At a given time instant, $t_7$ for example, at least a portion of one or more of the plurality of time shifted scrambling code segments $SCR_0(t_0), SCR_0(t_1), SCR_0(t_2), \ldots, SCR_0(t_7)$ may be generated simultaneously.

The descrambler block 316 may comprise suitable logic, circuitry, and/or code that may enable descrambling of at least one received signal. The descrambler block 316 may descramble at least one filtered signal received from the CMF block 306. When the MPD 302 is utilized to enable synchronization and timing acquisition, the descrambler block 316 may utilize the simultaneously generated the plurality of scrambling code segments $SCR_0, SCR_1, SCR_2, \ldots, SCR_{14}$, associated with a scrambling code, to descramble the received signal, and/or filtered signal. For each utilized scrambling code segment, among the simultaneously utilized plurality of scrambling code segments $SCR_0, SCR_1, SCR_2, \ldots, SCR_{14}$, a corresponding descrambled signal may be generated.

When the MPD 302 is utilized to determine a scrambling code among a plurality of scrambling codes $S[0], S[1], \ldots, S[7]$ within a scrambling code group, the descrambler block 316 may utilize the simultaneously generated plurality of scrambling code segments, $SCR[0]_1, SCR[1]_1, \ldots, SCR[7]_1$, associated with a corresponding scrambling code $S[0], S[1], \ldots, S[7]$, to descramble the received signal, and/or filtered signal. For each utilized scrambling code segment, a corresponding descrambled signal may be generated.

When the MPD 302 to enable multipath detection, the descrambler block 316 may utilize the plurality of time delayed versions of a scrambling code segment, $SCR_0(t_0), SCR_0(t_1), SCR_0(t_2), \ldots, SCR_0(t_{14})$, to descramble the received signal, and/or filtered signal. For each utilized scrambling code segment, among the plurality of time delayed versions of the scrambling code segments, a corresponding descrambled signal may be generated.

Each of the plurality of energy detector blocks $318a \ldots 318b$ may comprise suitable logic, circuitry, and/or code that may enable detection of an energy level in a received descrambled signal. The energy level may be computed based on the received descrambled signal received from the descrambler block 316 by the corresponding energy detector block.

The energy reporting block 320 may comprise suitable logic, circuitry, and/or code that may enable computation of an energy level based on a received plurality of energy levels received from the plurality of energy detector blocks $318a \ldots 318b$. When the MPD 302 is utilized to enable synchronization and timing acquisition, or to enable selection of a scrambling code within a scrambling code group, the energy reporting block 320 may compute an energy level that represents a maximum energy level from among the plurality of energy levels received from the plurality of energy detector blocks $318a \ldots 318b$. When the MPD 302 is utilized to enable multipath detection, the energy reporting block 320 may compute an energy level that represents a summation of the plurality of energy levels received from the plurality of energy detector blocks $318a \ldots 318b$.

Further details on the utilization of scrambling codes to facilitate synchronization, timing acquisition, and/or multipath detection may be found in U.S. patent application Ser. No. 11/399,908 filed on even date herein and is hereby incorporated herein in its entirety.

Figure 4:
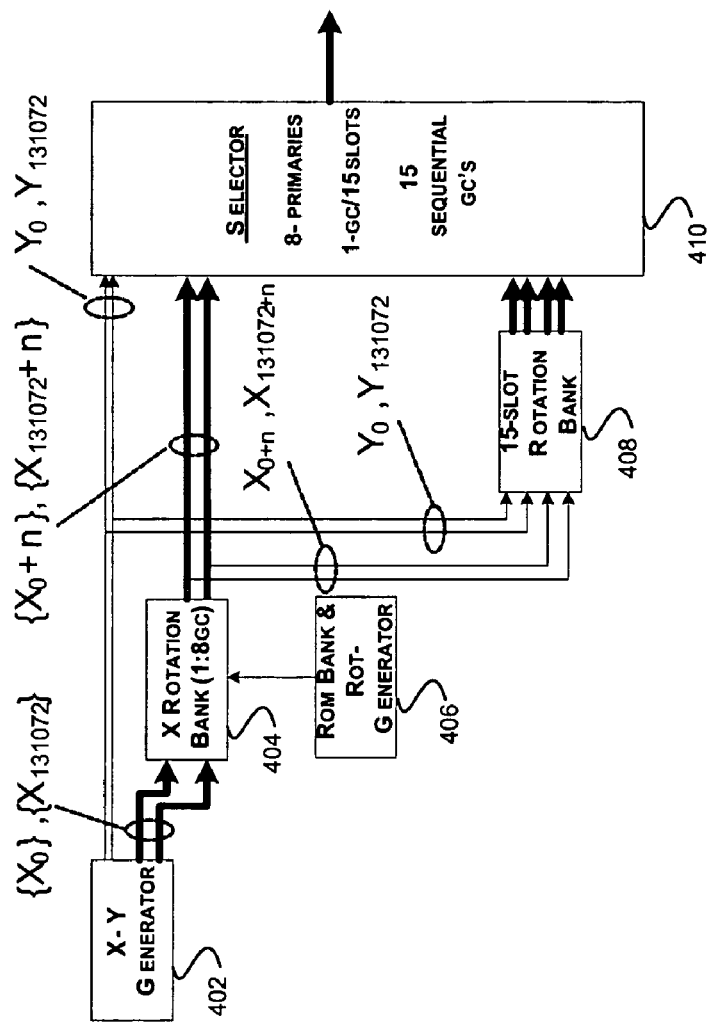
FIG. 4 is a block diagram of a system for efficient Gold code generation, in accordance with an embodiment of the invention.

FIG. 4 is a block diagram of a system for efficient Gold code generation, in accordance with an embodiment of the invention. Referring to FIG. 4, there is shown an XY generator 402, a rotation bank 404, a read only memory (ROM) bank 406, a 15-slot rotation bank 408, and a selector 410.

The XY generator 402 may comprise suitable logic, circuitry, and/or code that may enable generation of at least one codeword sequence. The codeword sequence may be generated as specified by relevant standards, for example, technical specification (TS) 25.213 from the $3^{rd}$ Generation Partnership Project (3GPP™). The codeword sequences may be utilized to generate one or more scrambling code segments. The codeword sequences may comprise an x sequence, a rotated x sequence, a y sequence, and a rotated y sequence. The x sequence, rotated x sequence, y sequence, and rotated y sequence may comprise a plurality of binary bits of information. The y sequence and rotated y sequence may be represented as serial bits. The x sequence and rotated x sequence may be represented as a plurality of data words. In an exemplary embodiment of the invention, the data words may comprise 18 bits. In FIG. 4, the x sequence may be labeled $X_0$, the rotated x sequence may be labeled $X_{131072}$, the y sequence may be labeled $Y_0$, the rotated y sequence may be labeled $Y_{131072}$.

The rotation bank 404 may comprise suitable logic, circuitry, and/or code that may enable multicode generation. The rotation bank may utilize mathematical operations. Multicode generation may comprise simultaneous generation of a plurality of scrambling code segments based on the generated sequences $X_0$ and/or $X_{131072}$. The rotation bank 404 may be utilized to generate a plurality of distinct rotated $X_0$ sequences. The plurality of rotated $X_0$ sequences may be referred to as $X_0+n$ streams, wherein n may represent an index corresponding to one of the scrambling codes $S[0], S[1], \ldots, S[7]$. The rotation bank 404 may also be utilized to generate a plurality of distinct rotated $X_{131072}$ sequences. The plurality of rotated $X_{131072}$ sequences may be referred to as $X_{131072}$+n streams, wherein n may represent an index corresponding to one of the scrambling codes S[0], S[1], ..., S[7].

The ROM bank 406 may comprise suitable logic, circuitry, and/or code that may enable storage of information that may be utilized to facilitate multicode generation based on the generated sequences $X_0$ and/or $X_{131072}$.

The 15-slot rotation bank 408 may comprise suitable logic, circuitry, and/or code that may enable storage of information that may be utilized to facilitate simultaneous generation of the plurality of scrambling code segments, for example $SCR_0$, $SCR_1$, $SCR_2$, ..., $SCR_{14}$, associated with a scrambling code.

The selector 410 may comprise suitable logic, circuitry, and/or code that may enable selection of at least one of: a plurality of simultaneously generated scrambling code segments associated with a scrambling code, a plurality of scrambling code segments associated with a corresponding plurality of scrambling codes, and/or a plurality of time shifted versions of a scrambling code segment. The operation of the selector 410 may be controlled by hardware, software, and/or firmware.

In operation, the plurality of $X_0$+n streams, $X_{131072}$+n streams, the y sequence, and/or the rotated y sequence may be utilized to enable a corresponding plurality of scrambling code segments $SCR[0]_1$, $SCR[1]_1$, ..., $SCR[7]_1$ to be generated simultaneously, for example. Each of the plurality of scrambling code segments may be associated with a corresponding one in the plurality of scrambling code segments S[0], S[1], ..., S[7]. The plurality of scrambling code segments, S[0], S[1], ..., S[7] may be associated with a scrambling code segment group. Each of the scrambling code segments may be simultaneously generated in phase, for example, at a given time instant the simultaneously generated plurality of scrambling code segments may be associated within a common slot among the plurality of slots within a WCDMA frame. The plurality of scrambling code segments may be generated based on at least one generated $X_0$+n stream and/or $X_{131072}$+n stream (for example an $X_0$+0 stream and/or an $X_{131072}$+0 stream) a y sequence, and/or rotated y sequence. The plurality of time shifted scrambling code segments $SCR_0(t_0)$, $SCR_0(t_1)$, $SCR_0(t_2)$, $SCR_0(t_{14})$, for example, may be generated simultaneously based on at least one generated $X_0$+n stream and/or $X_{131072}$+n stream (for example an $X_0$+0 stream and/or an $X_{131072}$+0 stream) a y sequence, and/or rotated y sequence. A plurality of time shifted scrambling code segments may be generated for each of the plurality of slots 0, 1, 2, ..., 14 within a WCDMA frame.

Figure 5:
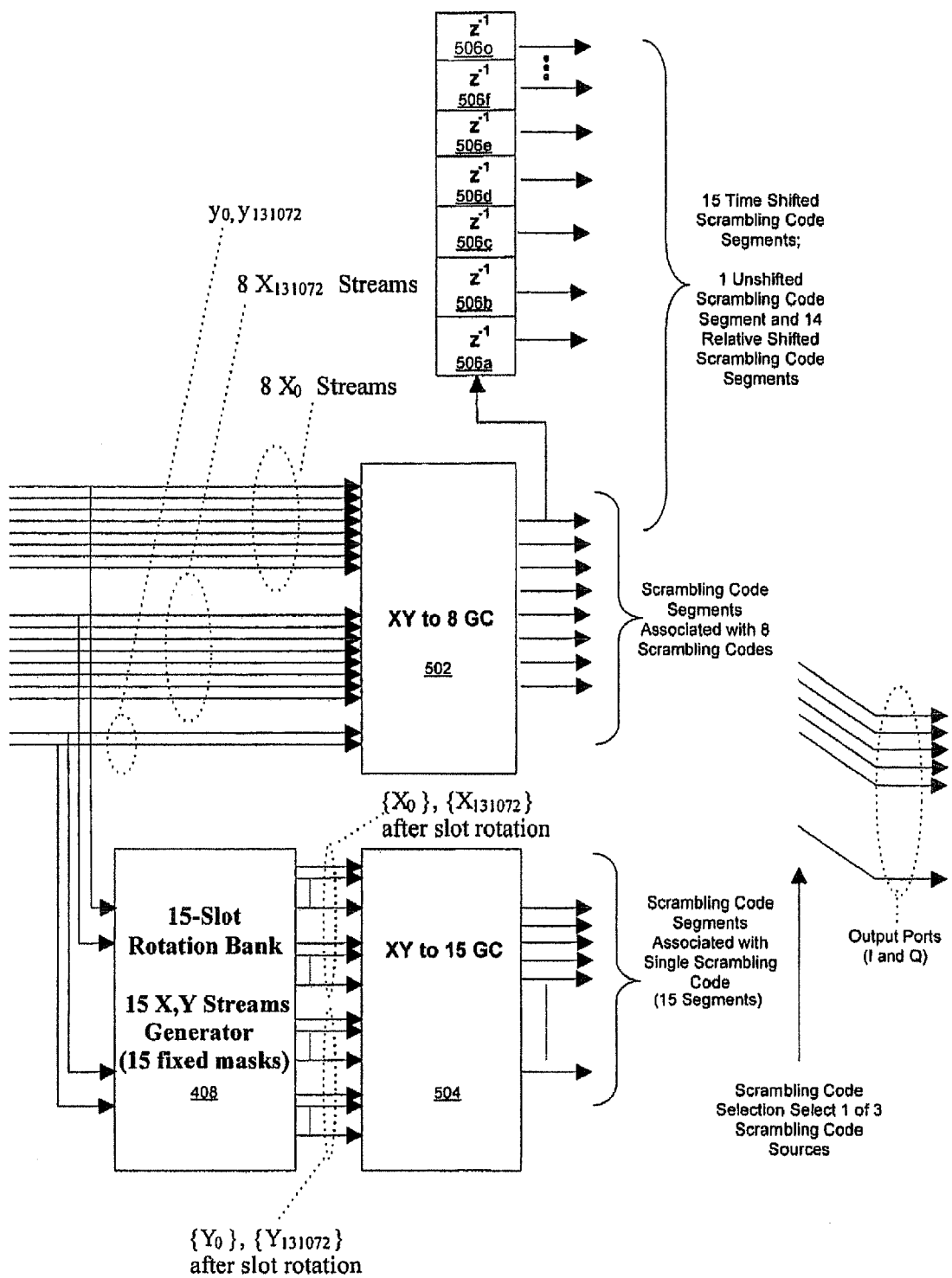
FIG. 5 is a block diagram for an exemplary selector, which may be utilized in an efficient system for Gold code generation, in accordance with an embodiment of the invention.

FIG. 5 is a block diagram for an exemplary selector, which may be utilized in an efficient system for Gold code generation, in accordance with an embodiment of the invention. Referring to FIG. 5, there is shown a 15-slot rotation bank 408, an XY to 8 Gold codes (GC) converter block 502, an XY to 15 GC converter block 504, and a plurality of time shifting blocks 506a, 506b, 506c, 506d, 506e, 506f, ... 506o. The 15-slot rotation bank 408 may be substantially as described in FIG. 4.

The XY to 8 GC converter block 502 may comprise suitable logic, circuitry, and/or code that may enable generation of a plurality of scrambling code segments associated with a corresponding plurality of scrambling codes. The XY to 8 GC converter block 502 may receive a plurality of $X_0$+n streams, $X_{131072}$+n streams, a y sequence, and/or rotated y sequence, and simultaneously generate a corresponding plurality of scrambling code segments associated with a corresponding plurality of S[n] scrambling codes, wherein n may be an index to a scrambling code within a scrambling code group. Each of the generated scrambling code segments may be represented as a corresponding I component and Q component (I, Q) representation. In at least one embodiment of the invention, 8 scrambling code segments may be simultaneously generated.

The XY to 15 GC converter block 504 may comprise suitable logic, circuitry, and/or code that may enable generation of a plurality of scrambling code segments associated with a scrambling code. The XY to 15 GC converter block 504 may receive one of the plurality of $X_0$+n streams, one of the plurality of $X_{131072}$+n streams, the y sequence, and/or rotated y sequence, and simultaneously generate a plurality of scrambling code segments associated with a corresponding one of the plurality of S[n] scrambling codes. Each of the generated scrambling code segments may be represented as a corresponding I component and Q component (I, Q) representation. In at least one embodiment of the invention, 15 scrambling code segments may be simultaneously generated.

Each of the plurality of time shifting blocks 506a, 506b, 506c, 506d, 506e, 506f, ..., 506o may comprise suitable logic, circuitry, and/or code that may enable reception of an input at a given time instant, and outputting of the received input at a subsequent time instant one time unit later. The time shifting block 506a may receive input comprising a scrambling code segment associated with one of the plurality of S[n] scrambling codes. The time shifting block 506b may receive input from the time shifting block 506a. Collectively the plurality of time shifting blocks 506a, 506b, 506c, 506d, 506e, 506f, ..., 506o may enable simultaneous generation one or more time shifted versions of a scrambling code segment. Each of the generated scrambling codes may be represented as a corresponding I component and Q component (I, Q) representation.

In one exemplary embodiment of the invention, as many as 15 time shifted scrambling code segments may be generated simultaneously. The 15 time shifted versions may comprise the input scrambling code segment to the time shifting block 506a, and the 14 relative time shifted scrambling code segments generated by the plurality of time shifting blocks 506a, 506b, 506c, 506d, 506e, 506f, ..., 506o. The plurality of time shifting blocks 506a, 506b, 506c, 506d, 506e, 506f, ..., 506o may generate scrambling code segments that may be time shifted relative to the input scrambling code segment to the time shifting block 506a. The input scrambling code segment may be referred to as an unshifted scrambling code segment.

The selector 410 (FIG. 4) may select outputs from the XY to 8 GC converter block 502, the XY to 15 GC converter block 504, or 1 output from the XY converter block 502 and outputs from the plurality of time shifting blocks 506a, 506b, 506c, 506d, 506e, 506f, ..., 506o. The selected outputs may be utilized by the descrambler 316 (FIG. 3).

Figure 6:
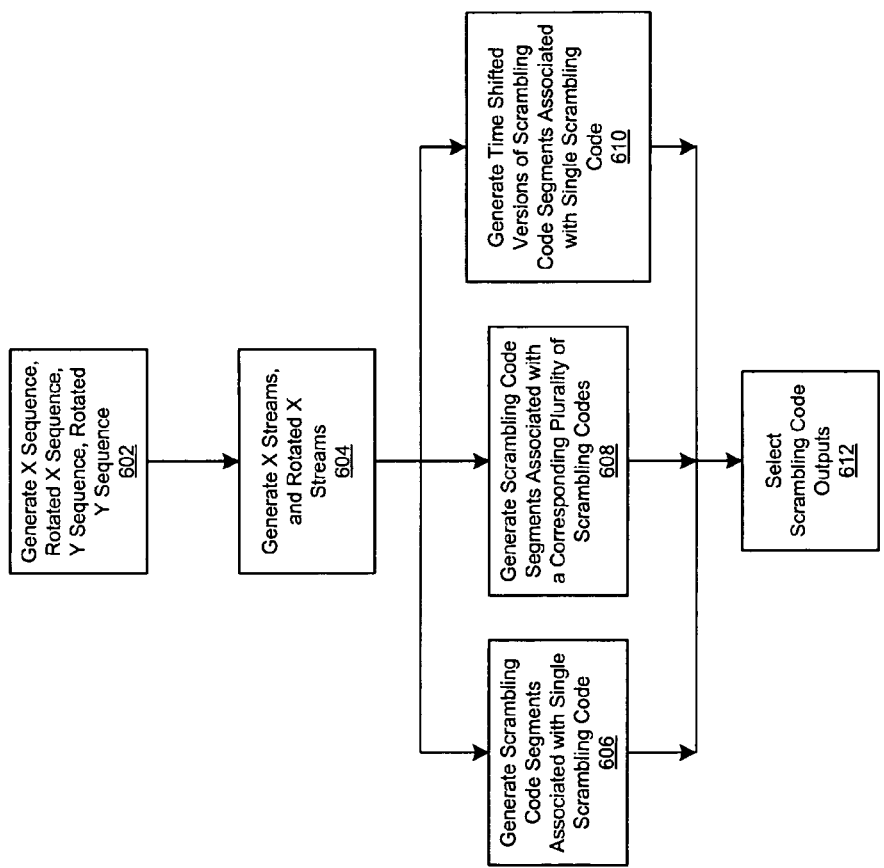
FIG. 6 is a flowchart illustrating exemplary steps for efficient Gold code generation and management in WCDMA systems, in accordance with an embodiment of the invention.

FIG. 6 is a flowchart illustrating exemplary steps for efficient Gold code generation and management in WCDMA systems, in accordance with an embodiment of the invention. Referring to FIG. 6, in step 602 an X sequence, rotated X sequence, Y sequence, and/or rotated Y sequence may be generated. In step 604, a plurality of X streams, $X_0$+n streams, and/or rotated X streams, $X_{131072}$+n streams, may be generated. In step 606 a plurality of scrambling code segments associated with a single scrambling code may be generated. In step 608, a plurality of scrambling code segments associated with a corresponding plurality of scrambling codes may be generated. In step 610, a plurality of time shifted versions of scrambling code segments associated with a single scrambling code may be generated. In various embodiments of the invention, steps 606, 608, and/or 610 may be performed simultaneously. In step 612, one or more outputs from steps 606, 608, and/or 610 may be selected.

Aspects of a system for processing signals in a communication system may include a Gold code generator 314 that enables simultaneous generation, based on at least one codeword sequence in a WCDMA system, of a plurality of scrambling code segments associated with a scrambling code, a plurality of scrambling code segments each associated with a corresponding one a plurality of scrambling codes, and a plurality of time shifted versions of at least one scrambling code segment associated with a scrambling code. The one or more codeword sequences may comprise an x sequence, a rotated x sequence, a y sequence, and/or a rotated y sequence. The x sequence and rotated x sequence may each be represented as a plurality of data words.

The Gold code generator 314 may enable generation of a plurality of x streams, wherein each of the plurality of x streams corresponds to a distinct rotated version of the x sequence, and/or a plurality of rotated x streams, wherein each of the plurality of rotated x streams corresponds to a distinct rotated version of the rotated x sequence. The Gold code generator 314 may also enable generation of the simultaneously generated plurality of scrambling code segments associated with the scrambling code based on the y sequence, the rotated y sequence, a corresponding one of the plurality of x streams, and a corresponding one of the plurality of rotated x streams. The Gold code generator 314 may also enable generation of the simultaneously generated plurality of scrambling code segments associated with the scrambling code based on the y sequence, the rotated y sequence, one of the plurality of x streams, and one of the plurality of rotated x streams. The Gold code generator 314 may also enable generation of the simultaneously generated plurality of time shifted versions of one or more scrambling code segments associated with the scrambling code based on the y sequence, the rotated y sequence, one of the plurality of x streams, and one of the plurality of rotated x streams.

The Gold code generator 314 may also enable selection of the plurality of scrambling code segments associated with the scrambling code, the plurality of scrambling code segments associated with the corresponding plurality of scrambling codes, and/or the plurality of time shifted versions of the one or more scrambling code segments associated with the scrambling code. The scrambling code may be a Gold code, or an orthogonal variable spreading factor code, for example.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will comprise all embodiments falling within the scope of the appended claims.

What is claimed is:

1. A method comprising:
performing, by at least one processor and/or circuit, the following:
simultaneously generating, based on at least one codeword sequence in a WCDMA system:
a first plurality of scrambling code segments, each scrambling code segment in the first plurality of scrambling code segments is associated with a common scrambling code,
a second plurality of scrambling code segments, each scrambling code segment in the second plurality of scrambling code segments is associated with a corresponding one of a plurality of scrambling codes, and
a third plurality of scrambling code segments, each scrambling code segment in the third plurality of scrambling code segments is a time shifted version of a common scrambling code segment.

2. The method according to claim 1, wherein said at least one codeword sequence comprises one or more of: an x sequence, a rotated x sequence, a y sequence and/or a rotated y sequence.

3. The method according to claim 2, wherein said x sequence is represented as a plurality of data words, and said rotated x sequence is represented as a plurality of data words.

4. The method according to claim 3, comprising generating one or more of: a plurality of x streams wherein each of said plurality of x streams corresponds to a distinct rotated version of said x sequence, and/or a plurality of rotated x streams wherein each of said plurality of rotated x streams corresponds to a distinct rotated version of said rotated x sequence.

5. The method according to claim 4, comprising generating the first plurality of scrambling code segments based on said y sequence, said rotated y sequence, a corresponding one of said plurality of x streams, and a corresponding one of said plurality of rotated x streams.

6. The method according to claim 5, comprising generating the third plurality of scrambling code segments based on said y sequence, said rotated y sequence, one of said plurality of x streams, and one of said plurality of rotated x streams.

7. The method according to claim 4, comprising generating the first plurality of scrambling code segments based on said y sequence, said rotated y sequence, one of said plurality of x streams, and one of said plurality of rotated x streams.

8. The method according to claim 1, comprising selecting one or more of: the first plurality of scrambling code segments, the second plurality of scrambling code segments, and/or the third plurality of scrambling code segments.

9. The method according to claim 1, wherein the common scrambling code comprises one or more of: a Gold code, and/or an orthogonal variable spreading factor code.

10. A computer program stored on a computer readable medium that is non-transitory, the computer program having at least one code section, the at least one code section being executable by a machine for causing the machine to perform steps comprising:
simultaneously generating, based on at least one codeword sequence in a WCDMA system:

a first plurality of scrambling code segments, each scrambling code segment in the first plurality of scrambling code segments is associated with a common scrambling code, a second plurality of scrambling code segments, each scrambling code segment in the second plurality of scrambling code segments is associated with a corresponding one of a plurality of scrambling codes, and a third plurality of scrambling code segments, each scrambling code segment in the third plurality of scrambling code segments is a time shifted version of a common scrambling code segment.

11. The computer program stored on the computer readable medium according to claim 10, wherein said at least one codeword sequence comprises one or more of: an x sequence, a rotated x sequence, a y sequence and/or a rotated y sequence.

12. The computer program stored on the computer readable medium according to claim 11, wherein said x sequence is represented as a plurality of data words, and said rotated x sequence is represented as a plurality of data words.

13. The computer program stored on the computer readable medium according to claim 12, comprising code for generating one or more of: a plurality of x streams wherein each of said plurality of x streams corresponds to a distinct rotated version of said x sequence, and/or a plurality of rotated x streams wherein each of said plurality of rotated x streams corresponds to a distinct rotated version of said rotated x sequence.

14. The computer program stored on the computer readable medium according to claim 13, comprising code for generating the first plurality of scrambling code segments based on said y sequence, said rotated y sequence, a corresponding one of said plurality of x streams, and a corresponding one of said plurality of rotated x streams.

15. The computer program stored on the computer readable medium according to claim 13, comprising code for generating the first plurality of scrambling code segments based on said y sequence, said rotated y sequence, one of said plurality of x streams, and one of said plurality of rotated x streams.

16. The computer program stored on the computer readable medium according to claim 15, comprising code for generating the third plurality of scrambling code segments based on said y sequence, said rotated y sequence, one of said plurality of x streams, and one of said plurality of rotated x streams.

17. The computer program stored on the computer readable medium according to claim 10, comprising code for selecting one or more of: the first plurality of scrambling code segments, the second plurality of scrambling code segments, and/or the third plurality of scrambling code segments.

18. The computer program stored on the computer readable medium according to claim 10, wherein the common scrambling code is one or both of: a Gold code, and/or an orthogonal variable spreading factor code.

19. A system comprising:

at least one processor that enables simultaneous generation, based on at least one codeword sequence in a WCDMA system, of a first plurality of scrambling code segments, each scrambling code segment in the first plurality of scrambling code segments is associated with a common scrambling code, a second plurality of scrambling code segments, each scrambling code segment in the second plurality of scrambling code segments is associated with a corresponding one of a plurality of scrambling codes, and a third plurality of scrambling code segments, each scrambling code segment in the third plurality of scrambling code segments is a time shifted version of a common scrambling code segment.

20. The system according to claim 19, wherein said at least one codeword sequence comprises one or more of: an x sequence, a rotated x sequence, a y sequence and/or a rotated y sequence.

21. The system according to claim 20, wherein said x sequence is represented as a plurality of data words, and said rotated x sequence is represented as a plurality of data words.

22. The system according to claim 21, wherein said at least one processor enables generation of one or more of: a plurality of x streams wherein each of said plurality of x streams corresponds to a distinct rotated version of said x sequence, and/or a plurality of rotated x streams wherein each of said plurality of rotated x streams corresponds to a distinct rotated version of said rotated x sequence.

23. The system according to claim 22, said at least one processor enables generation of the first plurality of scrambling code segments based on said y sequence, said rotated y sequence, a corresponding one of said plurality of x streams, and a corresponding one of said plurality of rotated x streams.

24. The system according to claim 22, said at least one processor enables generation of said simultaneously generated said plurality of scrambling code segments associated with said scrambling code based on said y sequence, said rotated y sequence, one of said plurality of x streams, and one of said plurality of rotated x streams.

25. The system according to claim 24, said at least one processor enables generation of the third plurality of scrambling code segments based on said y sequence, said rotated y sequence, one of said plurality of x streams, and one of said plurality of rotated x streams.

26. The system according to claim 19, said at least one processor enables selection of one or more of: the first plurality of scrambling code segments, the second plurality of scrambling code segments, and/or the third plurality of scrambling code segments.

27. The system according to claim 19, wherein the common scrambling code is one or both of: a Gold code, and/or an orthogonal variable spreading factor code.

* * * * *